(12) United States Patent
Kudav et al.

(10) Patent No.: US 9,003,739 B2
(45) Date of Patent: Apr. 14, 2015

(54) SOLAR PANEL WIND DEFLECTOR

(75) Inventors: Ganesh V. Kudav, Poland, OH (US); Yogendra M. Panta, Youngstown, OH (US)

(73) Assignee: Youngstown State University, Youngstown, OH (US)

( * ) Notice: Subject to any disclaimer, the term of this patent is extended or adjusted under 35 U.S.C. 154(b) by 0 days.

(21) Appl. No.: 13/534,016

(22) Filed: Jun. 27, 2012

(65) Prior Publication Data

US 2013/0000219 A1    Jan. 3, 2013

Related U.S. Application Data

(60) Provisional application No. 61/503,629, filed on Jul. 1, 2011.

(51) Int. Cl.
*E04D 13/18* (2014.01)
*F24J 2/46* (2006.01)
*F24J 2/52* (2006.01)

(52) U.S. Cl.
CPC .............. *F24J 2/4638* (2013.01); *F24J 2/5233* (2013.01); *F24J 2/5239* (2013.01); *Y02B 10/20* (2013.01); *Y02E 10/47* (2013.01)

(58) Field of Classification Search
CPC ... E04D 13/15; E04D 13/158; E04D 13/1585; B64C 3/14; B64C 3/18
USPC .......... 52/173.1, 24, 84, 741.3; 136/244, 245, 136/251; 126/621, 622, 623
See application file for complete search history.

(56) References Cited

U.S. PATENT DOCUMENTS

| | | | | |
|---|---|---|---|---|
| 2,562,227 A * | 7/1951 | Zobel | ........................... | 244/35 R |
| 2,873,700 A * | 2/1959 | Heier | ................................ | 52/12 |
| 2,894,783 A * | 7/1959 | Bird | .............................. | 296/168 |
| 3,280,524 A * | 10/1966 | Hull | ............................. | 52/173.1 |
| 3,335,429 A * | 8/1967 | Arp | ............................. | 52/716.2 |
| RE27,669 E * | 6/1973 | Rozanski | ..................... | 52/169.7 |
| 4,435,925 A * | 3/1984 | Jefferys | ............................ | 52/12 |
| 4,456,158 A * | 6/1984 | Wertz et al. | .................... | 224/316 |
| 6,606,828 B1 * | 8/2003 | Lin et al. | ............................ | 52/58 |
| 6,688,045 B1 * | 2/2004 | Pilcher | ............................ | 52/12 |
| RE38,988 E * | 2/2006 | Dinwoodie | .................... | 136/251 |
| 7,614,183 B2 * | 11/2009 | Nomura et al. | ................. | 47/65.9 |
| 7,956,281 B2 | 6/2011 | O'Brien et al. | | |
| 8,245,459 B2 * | 8/2012 | Belikoff et al. | ............... | 52/173.3 |
| 2003/0164187 A1* | 9/2003 | Dinwoodie | .................... | 136/251 |
| 2006/0016130 A1* | 1/2006 | Lin | .................... | 52/24 |
| 2009/0145053 A1* | 6/2009 | Lin | .................... | 52/84 |

(Continued)

OTHER PUBLICATIONS

Kern, E.C., Ballast-Mounted PV Arrays: Phase 2 Final Report—Ascension Technology, Lincoln, MA, US DOE Solicitation No. DE-PS36-97GO10222.

(Continued)

*Primary Examiner* — Christine T Cajilig

(74) *Attorney, Agent, or Firm* — Fay Sharpe LLP

(57) ABSTRACT

The invention relates to an aerodynamic wind deflector for use with pitched panels or structures mounted on horizontal, flat surfaces. More particularly, the invention relates to a wind deflector, including a contoured surface, for deflecting aerodynamic forces away from a pitched structure, such as a solar panel, mounted to a horizontal, flat surface, such as a roof top, wherein the structure is subjected to such aerodynamic forces. The wind deflector may further include a customized fin or fins as part of the design.

9 Claims, 11 Drawing Sheets

(56) References Cited

U.S. PATENT DOCUMENTS

| | | | |
|---|---|---|---|
| 2009/0320906 A1 | 12/2009 | Botkin et al. | |
| 2010/0269429 A1* | 10/2010 | Belikoff et al. | 52/173.3 |
| 2011/0197524 A1* | 8/2011 | Sahlin et al. | 52/173.3 |
| 2012/0000145 A1* | 1/2012 | Lin | 52/84 |
| 2012/0156048 A1* | 6/2012 | Riahi | 416/224 |
| 2012/0204497 A1* | 8/2012 | Omer | 52/84 |

OTHER PUBLICATIONS

Radu, A., et al., Steady wind pressures on solar collectors on flat-roofed building, J. Wind Eng. Ind. Aerodyn. 23 (1986), 249 pp.

Barkaszi, S. F. et al., Discussion of Strategies for Mounting Photovoltaic Arrays on Rooftops, Proceedings of Solar Forum 2001, Solar Energy: The Power to Choose, Apr. 21-26, Washington D.C., 6 pp.

Holmes, J.D., Wind Loading of Structures, Spon Press, London (2001) (uploaded to USPTO in 5 files).

Kalogirou, S., Solar thermal collectors and applications, Prog. Energy Combust. Sci. 20 (2004), 231 pp.

Healey, H.M., Florida's Winds Create Installation Problems for Solar Water Heating and Photovoltaic Modules on Buildings, Introduction to Solar Energy, Florida Alternative Energy Corporation, http://www.flaenergy.com/pic2r.htm, 2009, 3 pages.

Bitsuamlak et al., "Evaluation of Wind Loads on Solar Panel Modules Using CFD", Fifth Int'l Symposium on Computational Wind Engineering (CWE2010), Chapel Hill, NC, May 23-27, 2010.

Kopp et al., Wind loads on a solar array, Wind Struct. Int. J. 5 (5) (2002), 393 pp.

Rooftop Solar Arrays and Wind Loading—A Primer on Using Wind Tunnel Testing as a Basis for Code Compliant Design per ASCA 7, Boundary Layer Wind Tunnel Laboratory, University of Western Ontario, Faculty of Engineering, London, Ontario (Jul. 2011).

National Hurricane Center and USA National Hurricane Center, USA, Addressing: http://www.nhc.noaa.gov.

Radu, A. et al., Wind forces on structures supporting solar collectors, J. Wind Eng. Ind. Aerodyn. 32 (1989), 93 pp.

Fan Specifications provided by Cincinnati Fan Co. (retrieved from the Internet Nov. 4, 2012).

Wood, G. S.et al., Wind loads on industrial solar panel arrays and supporting roof structure, WindStruct, Int. J. 4 (6) (2001), 481 pp.

O'Brien, C. 2006, Roof-mounted Solar Photovoltaic Arrays: Technical Issues for the Roofing Industry, Interface, Trade Journal of RCI, Inc. March 13 pp.

Chung et al., "Reduction of wind uplift of a solar collector model", Journal of Wind Engineering and Industrial Aerodynamics 96 (2008) 1294-1306.

Oliphant, M., Measurement of wind speed across a solar collector, Sol. Energy 24 (1980), 403 pp.

Kudav, G.V. et al., Phase I report for Northern States Metals, Computational Fluid Dynamic (CFD) Simulation of lift and drag loads on inclined thin and thick film roof-top solar panels: base models and in conjunction with various wind deflectors; Nov. 2009.

* cited by examiner

1A

1C

1D

1B

2A

2B

2C

Wind force vs. wind speed for deflector-only in wind tunnel tests

Wind force vs. wind speed for single panel only-only in wind tunnel tests

Wind force vs. wind speed for single panel and deflector in wind tunnel tests

Wind force vs. wind speed for three panel-only in wind tunnel tests

FIGURE 13
Wind force vs. wind speed for three panel and deflector in wind tunnel tests
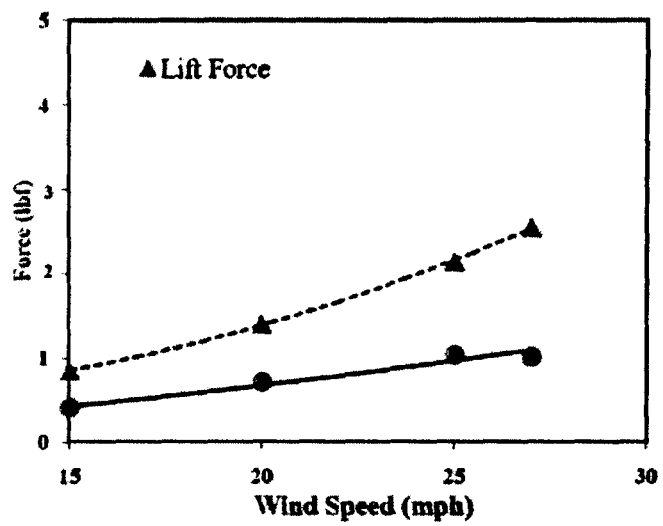
FIGURE 14
14A        14B
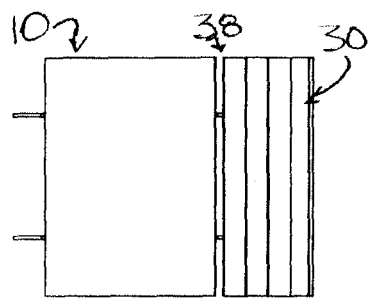 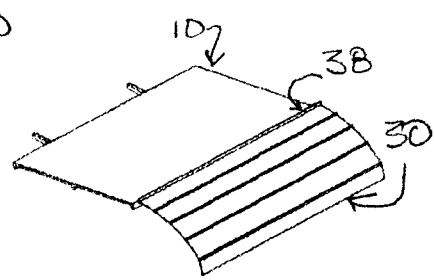
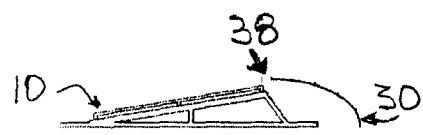
14C

FIGURE 15
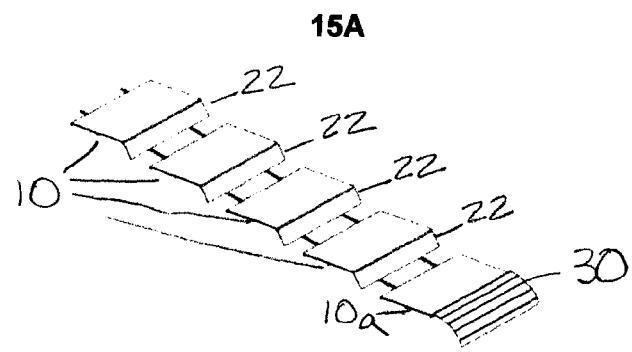
15A
15B
FIGURE 16
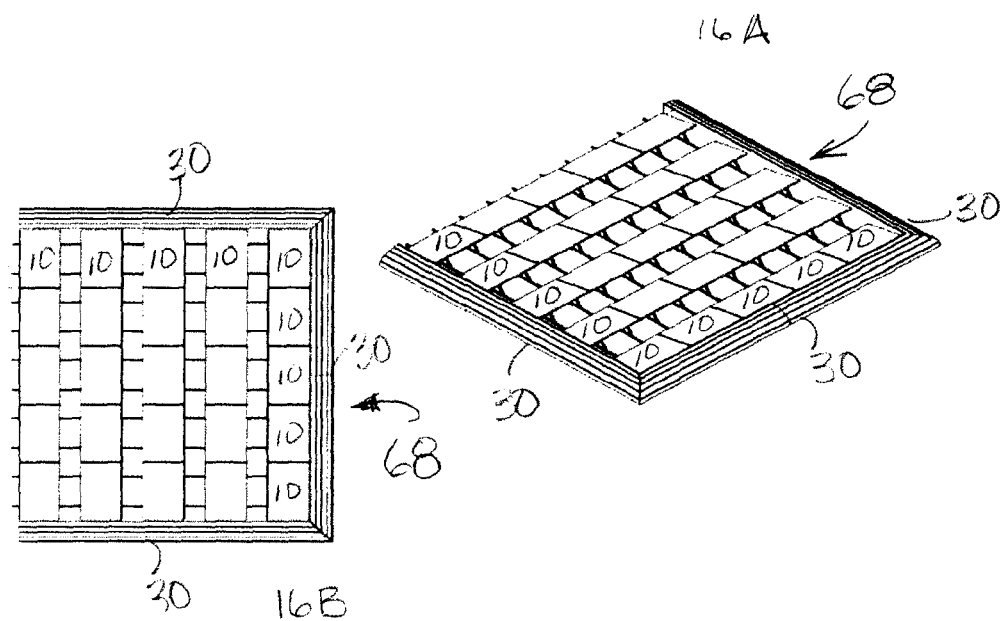

SOLAR PANEL WIND DEFLECTOR

PRIORITY DATA

This application claims priority under 35 USC §119(e)(1) to U.S. Provisional Application Ser. No. 61/503,629, filed Jul. 1, 2011, entitled "Design of Wind Deflector for Roof-Top Mounted Solar panels to Reduce Uplift and Wind Drag" the entire teachings of which are incorporated herein by reference.

FIELD OF THE INVENTION

The invention relates to an aerodynamic wind deflector for use with pitched panels or structures mounted on horizontal, flat surfaces. More particularly, the invention relates to a wind deflector, including a contoured surface, for deflecting aerodynamic forces away from a pitched structure, such as a solar panel, mounted to a horizontal, flat surface, such as a rooftop, wherein the structure is subjected to such aerodynamic forces. The wind deflector may further include a customized fin or fins as part of the design. While the aerodynamic wind deflector is disclosed herein primarily for use with roof-top mounted solar panels, it will be appreciated by those skilled in the relevant art that the invention finds application for use with any structure adversely affected by lift, drag, or other effects of aerodynamic forces due to its mounting position.

BACKGROUND

Solar panels have become a popular resource for green energy harvesting. Depending on the intended application for the resulting energy, the "solar panel" may comprise one or more small solar cells in a very small configuration, for example inches in width and height, or may comprise larger and/or many solar cells configured into a single panel or multiple panel system having a much larger footprint, for example, feet or yards in width and height.

Larger panels may advantageously be placed, for example, on the roof tops of buildings to avoid reduction in usable ground space and detraction from the aesthetic appearance of the area surrounding the building. More particularly, placement on a roof top may provide increased access to uninterrupted light source for gathering solar energy. These and other like considerations make roof-top or elevated placement of solar panels desirable.

Roof-top mounting of solar panels, however, while it resolves the foregoing issues, may create additional problems that must then be addressed. Such problems may include instability of the panel due to exposure to high winds. Due to strong winds and possible natural disaster situations, solar panel support systems and mounting configurations may experience high wind loads, mainly including wind uplift and wind drag. Solar panels are typically not aerodynamically shaped, i.e., they are generally relatively flat rectangular panels comprised of a plurality of solar cells configured in a grid-like pattern. The panels are generally placed at an angle in order to maximize direct sun exposure throughout the day. For example, they are usually placed at an angle of up to about 30° in relation to the surface on which they are mounted, assuming the surface to be horizontal, although greater angles may be used. Of course, the surface may itself represent an incline. Positioned in this manner, the shape, thickness, and angle of the panels create wind lift, wind drag, wind caused moment, wind noise, and increased wind resistance. Over time, or even instantaneously in extreme conditions, wind causes the panels to become unstable, and they may eventually pull loose of the surface to which they are mounted, thereby presenting a public safety issue, to people and property in the vicinity of the structure to which they are mounted.

Solar panel support system manufacturers generally use a ballasted system in order to secure the panels, sometimes referred to as arrays, on the roof surface so that the system will be stabilized by its own weight. Several studies have been conducted to find a suitable replacement for the traditional ballast system used with solar panels for counteracting aerodynamic forces. However, this work has not identified an alternative system to replace traditional ballast systems, which are not only bulky but also take considerable space and add a large amount of weight on the rooftop. Further, ballast systems prove to be a considerable additional expense, both in manufacture and installation, beyond the array expense which may already be costly. As such, conventional ballasting systems may represent several drawbacks. In contrast, wind deflectors are versatile and address the foregoing drawbacks, and as such hold promise as a replacement for more traditional ballast systems.

Attempts have been made to resolve the foregoing drawbacks to the use of roof top and other mounted solar panels. One of the more popular attempts proposes guarding the solar panel from wind by placing an obstruction having a specific profile hinged with the ballast system. U.S. Pat. No. 7,956,281 provides a flexible wind deflector for solar panel array perimeter assembly. U.S. Pub. App. 2009/0320906 provides a photovoltaic module with a removable wind deflector. While such attempts to resolve the drawbacks of roof-top mounted solar panels have been made, such mounting systems continue to suffer drawbacks that may result in safety issues, as well as power loss.

Therefore, there remains a need for a solar panel wind deflector that is not only versatile, but is uniquely conceptualized and designed to achieve aerodynamic force reduction, preferably of at least 50%, and that is also easy to assemble and install. Further, a need exists for a wind deflector for new or existing solar panel assemblies or systems suitable to replace currently employed ballast systems, making the use of the panels more economical. These and other advantages of the invention disclosed herein will become apparent upon reading and understanding the disclosure.

BRIEF SUMMARY OF THE INVENTION

The invention provides, in one embodiment, a wind deflector configured for mounting with a structure secured to a horizontal surface, wherein the wind deflector has a curved profile. The wind deflector is positioned such that the curve is convex to the structure and receives one or more aerodynamic forces before such aerodynamic forces encounter the structure. In one embodiment the structure is a solar panel.

In one embodiment, the wind deflector has a profile that is one of parabolic, quarter circle, or elliptical. In one embodiment, the deflector has a parabolic profile and satisfies the expression:

$$y = A\sqrt{\left(1 - \frac{x}{B}\right)}$$

wherein A and B are linear measurements and A=the vertical height of the structure, and B=the horizontal length of the wind deflector. In one embodiment, the wind deflector satisfying the foregoing expression has a parabolic profile and is positioned to deflect enough aerodynamic force to reduce uplift by at least about 50%

In another embodiment, the wind deflector is provided for use with a structure secured to a horizontal surface, for example a roof-top, at an angle of up to about 30°.

In yet another embodiment, the wind deflector further includes at least one fin configured to run parallel to the horizontal surface and the full width, w, of the wind deflector. The wind deflector may have has a width, w, that is at least equal to the width of the structure and a height, h, that is at least equal to the distance between the horizontal surface and a highest portion of the structure. In addition, the wind deflector may be positioned such that a gap of at least about 1 inch exists between the highest portion of the structure and an upper edge of the deflector. In an alternative embodiment, the wind deflector is secured directly to the panel such that there is no gap, or a gap of less than 1 inch exists.

Also provided is a method for reducing the aerodynamic forces experienced by a roof-top solar panel including a wind deflector in accord with any of the foregoing.

These and other advantages of the invention will be realized upon a reading and understanding of the following disclosure, in conjunction with the Figures and claims provided.

BRIEF DESCRIPTION OF THE DRAWINGS

FIG. 13 is a graph of wind tunnel results for 3 panel series and deflector in accord with an embodiment of the invention.

FIG. 14 is a schematic diagram of the deflector spacing relative to a front panel in accord with an embodiment of the invention.

FIG. 15 is a schematic diagram of covers for $2^{nd}$ through $5^{th}$ panels in a 5-panel array in accord with an embodiment of the invention.

FIG. 16 is a deflector wall around a panel array in accord with an embodiment of the invention.

DETAILED DESCRIPTION OF THE INVENTION

Figure 1A:
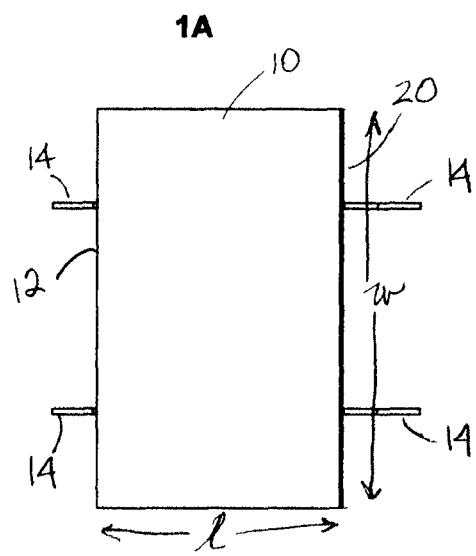
FIGS. 1A-1D are schematic diagrams of a solar panel in accord with an embodiment of the invention.

The invention relates to an aerodynamic wind deflector for use with pitched panels or structures mounted on horizontal, flat surfaces. More particularly, the invention relates to a wind deflector, including a contoured surface, for deflecting aerodynamic forces away from a pitched structure, such as a solar panel, mounted to a horizontal, flat surface, such as a roof top, wherein the structure is subjected to such aerodynamic forces. The wind deflector may further include a customized fin or fins as part of the design. While the aerodynamic wind deflector is disclosed herein primarily for use with roof-top mounted solar panels, it will be appreciated by those skilled in the relevant art that the invention finds application for use with any structure adversely affected by lift, drag, or other effects of aerodynamic forces due to its mounting position.

With regard to the disclosure, though design parameters and testing may be presented with particular reference to roof-top mounted solar panels, it is understood that the principles defined and taught herein find application to other scenarios wherein a pitched structure mounted to a horizontal, flat surface is adversely affected by aerodynamic force. Therefore, the term "structure" may be used herein to refer to any such pitched structure, including for example solar panels or arrays thereof. As such, the terms "structure", "solar panel", or "solar array", "panel series", or any combination of those terms, may be used interchangeably herein, and both are intended to refer to any such apparatus or device in a like scenario with regard to aerodynamic force. Further, use of the term "solar panel" or "structure" is understood to include singular or plural such panels or structures, whether used individually, as a part of a grouping, system, or array, or as a part of a plurality of groupings, systems, or arrays. Likewise, the term "mounting surface" as used herein may refer to a roof top, a pole, a post, a tower, or any other surface to which a solar panel or structure may be secured that exposes the panel or structure to aerodynamic force, and the use of any of the foregoing is understood to refer to any other of these mounting surfaces unless otherwise stated.

While the following disclosure is particular to solar panels or arrays, and the use of the inventive wind deflector with the same, this is but one embodiment of the invention and is not intended to be limiting of the invention in any way. As such, the teaching and principles provided find application to any pitched structure mounted on a substantially horizontal surface. All reference numerals remain consistent throughout all figures with regard to like parts of the structure and deflector. Further, a particular reference numeral not be included in a particular figure does not indicate that that aspect is not included, only that it is not being highlighted in that figure.

Figure 1B:
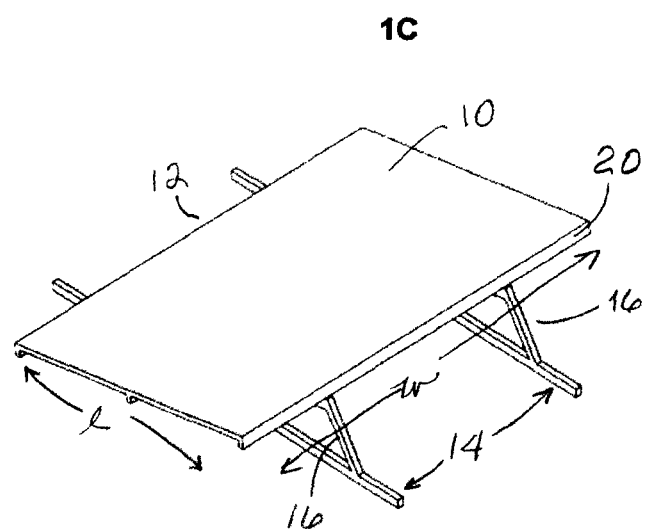
Figure 1C:
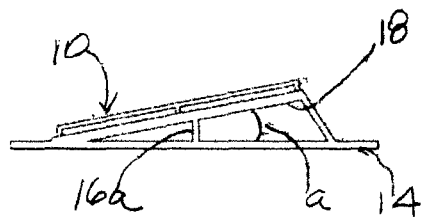
Figure 1D:
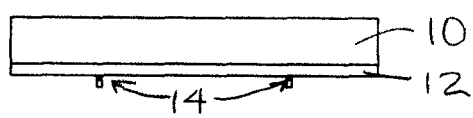

With reference to FIGS. 1A to 1D, there is shown a structure, in this embodiment a solar panel 10, having a width, w, and a length, l. FIG. 1A is a top view of the structure 10. FIG. 1B is a view of structure 10 from front edge 20. FIG. 1C provides a view of structure 10 showing a mounting system which includes rails 14 including braces 16 that provide support to the pitched structure. Braces 16 may be fixed or may be movable such that the supported structure may be raised or lowered to change the mounting angle between the structure 10 and the surface to which the structure is mounted. FIG. 1D is a side view of structure 10 in the pitched or raised position at angle, a. As shown in FIG. 1D, the mounting system includes upper rails 18 that attach to and support the underside of structure 10, away from the light exposed side, and lower rails 14 that secure to the mounting surface (not shown). FIG. 1D further includes intermediate brace 16a, that may optionally be placed between braces 16 and front edge 20 along rails 14, 18 to provide additional support. It is understood that depending on the size of the structure, the mounting system may include multiple sets of upper and lower rails 14, 18 and braces 16 along the width, w, of the structure 10. The "structure" 10 may be a solar panel, and further may be a single panel, or a configuration of multiple panels or an array, which may be assembled in a grid pattern (not shown) or in series, as shown, for example, in FIG. 16. Still further, each panel may include multiple solar cells (not shown).

The wind deflector provided has a configuration or design, determined by modeling and wind tunnel testing as shown below, to be optimum for reduction of the negative effect of wind load, i.e., of wind lift and wind drag. For purposes of modeling and wind tunnel testing, and as further defined in the disclosure and Figures provided herein, all results are based on testing of a solar panel or a solar array, mounted on a horizontal flat surface, and experiencing a wind speed generally of between 15 and 27 mph, directed north to south, or front 20 to back 12 against structure/panel 10, assembled and mounted as part of a solar panel rack at an inclination angle, α, of 10°. Single sample panels had dimensions of, for example, about 30 in. by about 20 in. Results from panels of this dimension can be scaled to larger arrays or other single panel dimensions.

Several different deflector profiles were tested, including inclined plane, quarter circle, ellipse, and parabolic. Though all configurations may be successfully used, the following analysis of aerodynamic forces acting on the various structures tested show that a parabolic shaped deflector, as better described hereafter, provided the most significant wind force reduction. In addition, it was determined during testing that the addition of fins, extending outward from the parabolic surface of the deflector provided further benefit with regard to wind force reduction. Generally, a suitable deflector is at least as wide as the mounted, pitched structure, or panel/array, and has a height, h, at least equal to the highest vertical position of the structure when pitched. The deflector may be positioned and secured such that the front edge 20 of the structure/panel 10 is protected or shielded against oncoming wind or aerodynamic force. In testing of the selected design in at least one embodiment, as described more completely below, a reduction in wind uplift force of up to 50% was realized.

In order to determine the deflector design best suited to achieve wind force reduction, CFD simulations of full-scale and quarter-scale solar panel arrays, both with and without the deflector, were conducted. In addition, wind tunnel tests were conducted on quarter-scale configurations. More specifically, wind tunnel testing was completed and a full analysis of measurements and data conducted. Once completed, CFD modeling was undertaken using grid scheme, grid size, and convergence criteria, and this data was compared with the actual wind tunnel test results. Based on this comparison, computational algorithms were refined and a further evaluation of the use of CFD to predict wind loads on full-scale individual and multiple straight arrays was determined. All simulations were based on static loading produced by a steady horizontal wind. An acceptable level of agreement, within an acceptable limit of error, was achieved, generally below 25%. It was determined that CFD results are highly dependent on grid size and quality, choice of the turbulence model, and the convergence criteria.

Finally, using the foregoing analysis as a basis, wind deflector designs were evaluated, and further determination for integrating the deflector with a solar panel was conducted, though it is understood that modifications in both may be expected to render similar results depending on the actual panel design and placement. While the results of testing provided herein are particular to the orientation and panel specifications provided, one skilled in the art would be expected to be able to extrapolate the provided data for application to other orientation/panel specification scenarios.

Using the CFD software as noted above, wind loads, such as drag and uplift forces, on pitched structures mounted on horizontal surfaces at an inclination of 10° for the wind speed of 110 mph were estimated. The simulations were conducted for the extreme wind conditions with wind direction presumed horizontal from north to south on south-facing panels, and panels were evaluated with and without wind deflectors in place, under identical test conditions.

The advantages of using wind deflectors versus not using any wind management systems were also considered. As noted above, several deflector profiles were considered and evaluated, including inclined plate, quarter circle, ellipse, and parabolic shapes. It was determined that a deflector with a parabolic profile, having fins running parallel to its width, produced the most desirable wind load reduction characteristics. As such, in one embodiment of the invention, testing included the parabolic design, the results of which are presented herein for exemplary purposes. This design demonstrates a significant decrease in the wind loads, particularly uplift, on the panels, i.e., by at least 50% or more. Further, use of the design specified herein provides the added advantage of minimizing or completely eliminating the commonly required ballast.

Figure 2A:
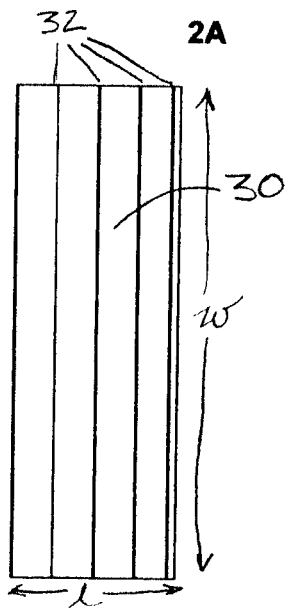
FIGS. 2A-2C are schematic diagrams of a wind deflector in accord with an embodiment of the invention.
Figure 2B:
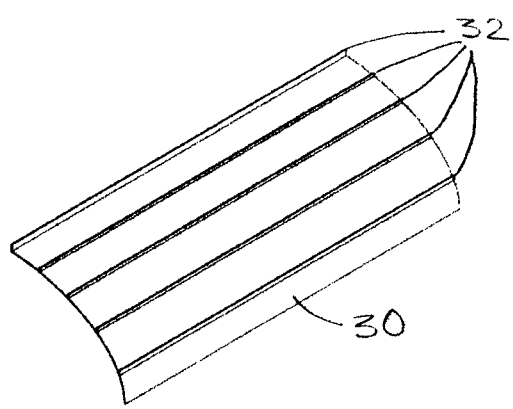
Figure 2C:
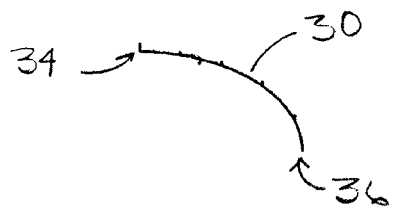

FIGS. 2A to 2C provide schematic diagrams of the profile of a deflector in accord with an embodiment of the invention. FIG. 2A is a top view of deflector 30, having a width, w', and a length, l', and spaced fins 32 extending in a parallel fashion with regard to each other along the width, w', of the deflector 30. FIG. 2B provides a profile of the deflector showing more clearly the parabolic shape thereof. FIG. 2C is a side view of deflector 30, showing that the profile is shaped such that top and bottom edges 34, 36 of the deflector 30 are at right angle to one another.

Figure 17A:
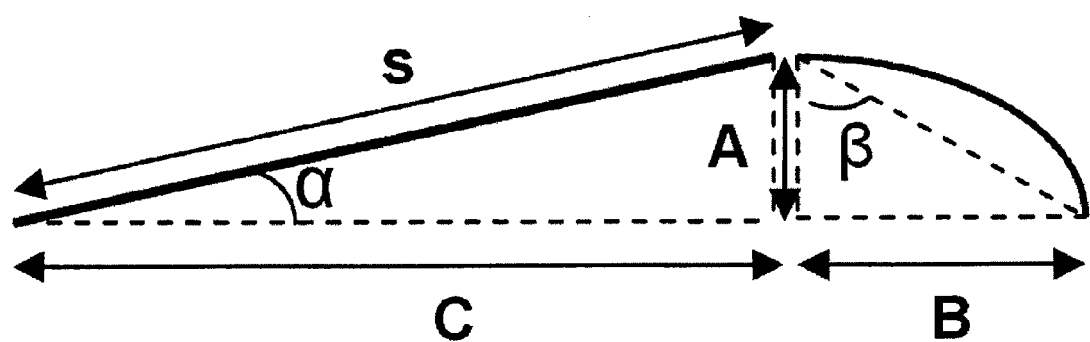
FIGS. 17A-C are schematic diagrams of wind deflectors having parabolic, quarter-circle, and elliptic profiles, respectively.
Figure 17B:
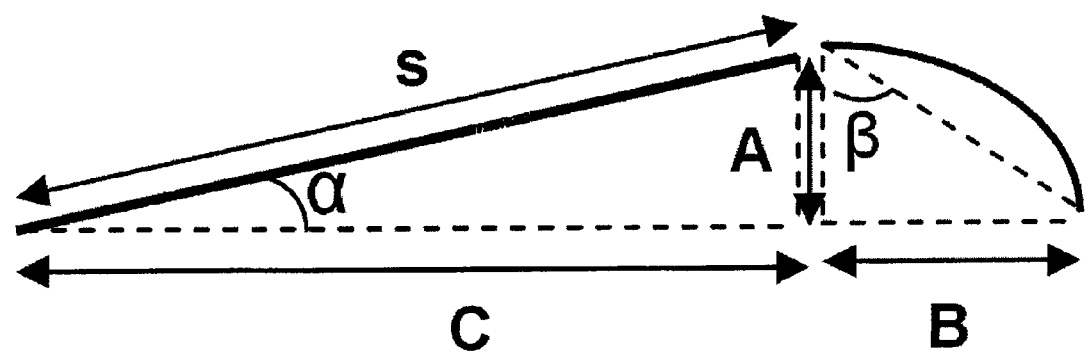
Figure 17C:
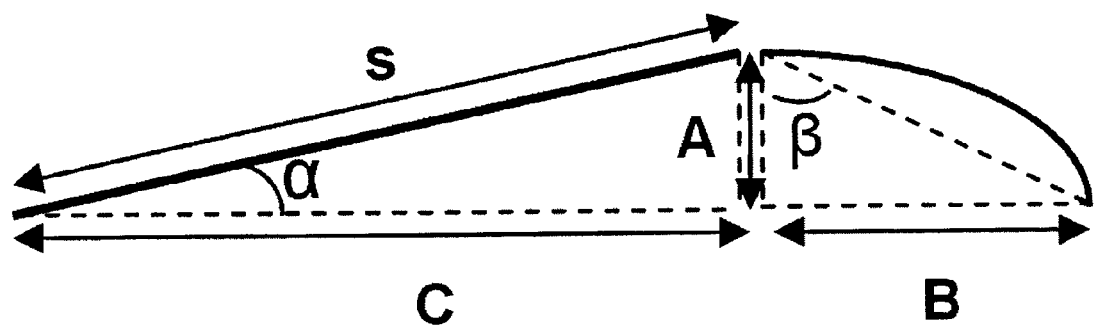

In one embodiment, the curve surface profile of a deflector in accord herewith can be determined using FIG. 17A through C and the expressions below:

$$y = A\sqrt{\left(1 - \frac{x}{B}\right)}$$

for a parabolic profile (A<B) (FIG. 17A)

$$y = A\sqrt{1 - \left(\frac{x}{B}\right)^2}$$

for a quarter-circle profile (A=B) (FIG. 17B)

$$y = A\sqrt{1 - \left(\frac{x}{B}\right)^2}$$

for an elliptical profile (A<B) (FIG. 17C)

With regard to the foregoing, the letters A, B, and C are linear measurements for vertical height of the solar panel, horizontal length of the wind deflector, and horizontal length of the solar panel, respectively. Here, α, s and h are the incline angle, slant height and the vertical height of the solar panel, respectively, such that:

$$A = h = s \sin \alpha$$

$$B = s \sin(\alpha) \cdot \tan(\beta)$$

For example, for a solar panel having a height, h, of about 24 in., mounted with a panel at an incline angle of 10°, the equation and the parameters used to determine the parabolic curve of the deflector are:

$$y = 24\sqrt{\left(1 - \frac{x}{42}\right)}$$

$$A = h = 24'', s = 138.2'', B = 42''$$

Other deflector profiles were also considered for wind force reduction and their general equations were shown with the schematics of the deflectors above.

Figure 4:
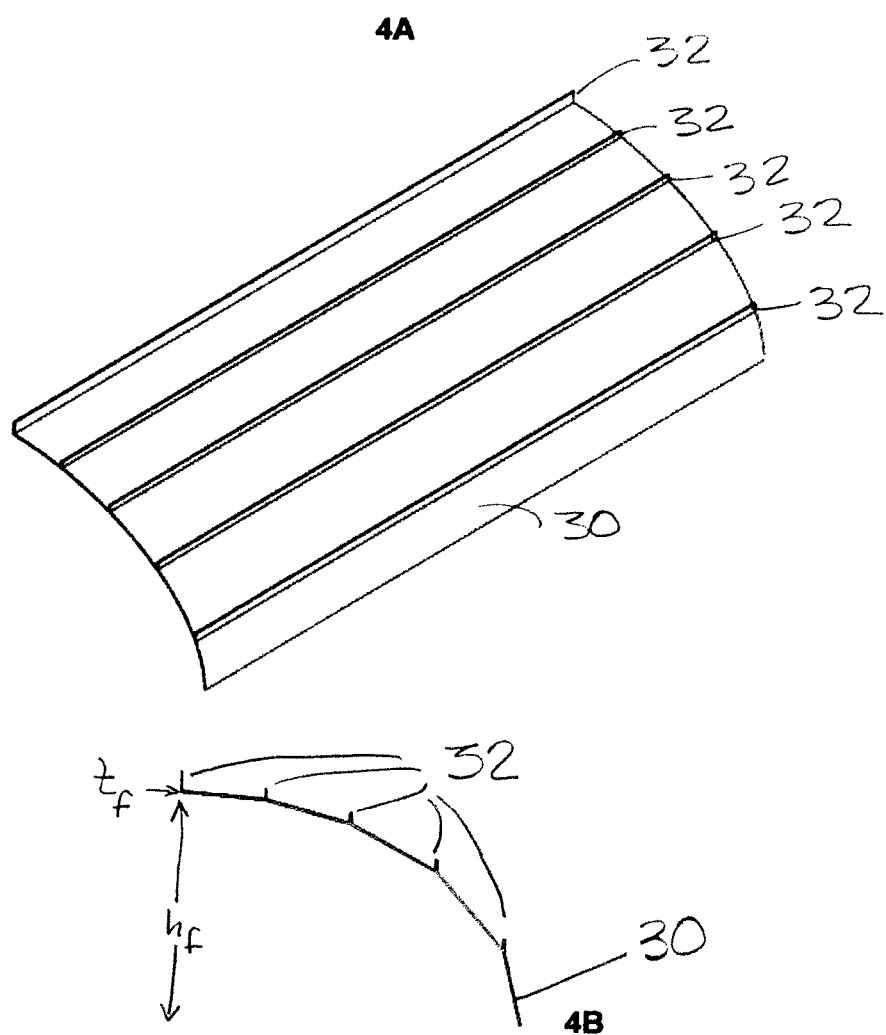
FIGS. 4A-4B are schematic diagrams showing fin dimensions in accord with an embodiment of the invention.

In addition, in accord with at least one embodiment of the invention, fins having a height, $h_f$, and a thickness, $t_f$, were used on the deflector profiles. With regard to one embodiment, a recommended fin design, as shown in FIGS. 4A-4B, exhibits a height, $h_f$, of ≥2 in. and a thickness, $t_f$, of ≥⅛ in., respectively.

Wind-Tunnel Testing

The wind tunnel testing was conducted in a wind tunnel having a cross-sectional area of 4 ft. wide×4 ft. high and a length of 16 ft. Wind tunnel testing was completed to measure the lift and drag forces on a scaled, downstream-facing single solar panel at various wind speeds, with and without a to-scale deflector positioned in front of the panel. In addition, wind tunnel testing was done to measure lift and drag forces on a scaled deflector having the parabolic profile at various speeds. Wind tunnel experiments were also conducted for a three-row arrangement of solar panels placed one in front of the other in a down-stream facing row, with and without a scaled deflector placed in front of the series or array.

The wind tunnel instrumentation included an axial fan powered by a 10-hp motor in 4 ft. diameter housing, available commercially from the Cincinnati Fan Co., Mason, Ohio. A 4 ft diameter-to-4 ft square transition connecting the motor housing and the wind tunnel test section was installed. The motor speed was controlled by a variable frequency drive (VFD) PowerFlex-4M, commercially available from Allen-Bradley, that could be controlled in the forced draft or induced draft mode, and was programmed via a laptop by providing variable voltage between 0-10 V dc through a National Instruments' data-acquisition system (DAQ). The fan specifications are such that wind speeds could be generated up to 35 mph provided the pressure drop from flow inlet to outlet was negligible, though the maximum wind speed actually generated in the wind tunnel was 27 mph.

Wind-Tunnel Instrumentation

Figure 3:
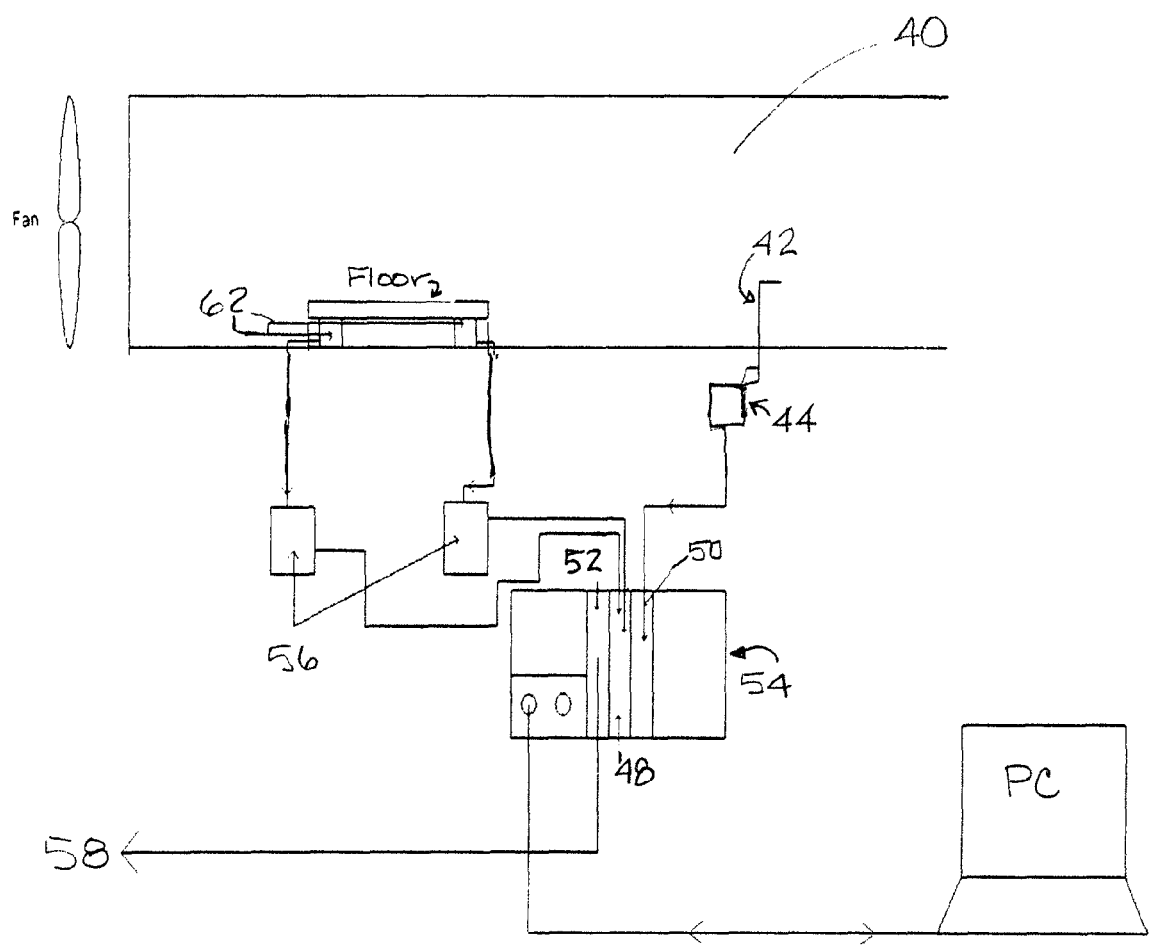
FIG. 3 is a schematic diagram of the wind tunnel setup with instrumentation in accord with an embodiment of the invention.

The schematic of the wind tunnel setup with instrumentation is shown in FIG. 3. The fan motor speed was controlled using VFD to generate variable input frequencies to the motor that translated into variable wind speeds in the tunnel. The VFD was actuated via a laptop (Dell E5500) utilizing LAB-VIEW v8.6 drivers and National Instruments' module NI 9264 providing voltage in the range of 0~10 V dc.

With reference to FIG. 3, within wind tunnel 40, at each motor (not shown) rpm, the Pitot—static tube 42, connected to an electronic pressure sensor 44 (model 20 INCH D-MV R8B22-58 available from All Sensors) measured the pressure difference ($P_0 - P_\infty$), where $P_0$ is the stagnation pressure and $P_\infty$ is the static pressure in the wind tunnel. The pressure sensor output a dc voltage to module NI 9219 (FIG. 3, 48) with a supplied excitation voltage of 2.5 V dc. Next, through a calibration procedure provided for sensor 44, the voltage was converted to a pressure difference in inches of water, and further converted through Bernoulli's equation to wind speed in mph. The wind tunnel was calibrated by recording wind speeds at various input frequencies from 0 to 80 Hz in order to interpolate between the wind speed and the corresponding input frequency. Bernoulli's principle states the relation between pressure, velocity, and elevation. The equation is known to those skilled in the relevant field of art.

Figure 5:
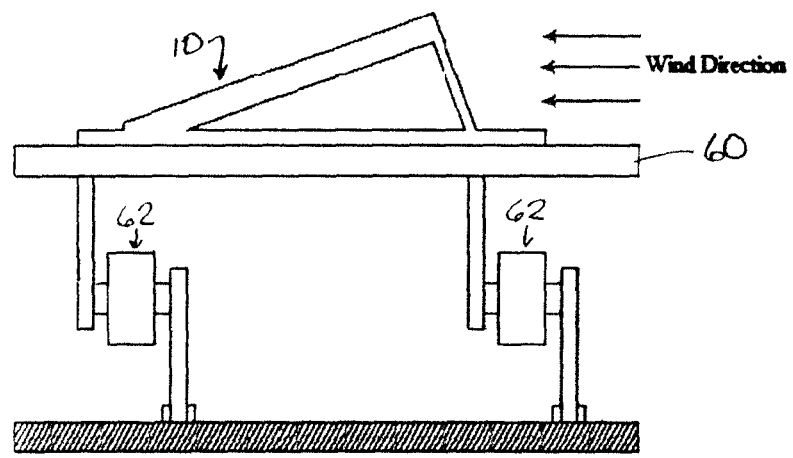
FIG. 5 provides a schematic diagram for a wind tunnel having load cells placed horizontally in order to record the drag force in accord with an embodiment of the invention.
Figure 6:
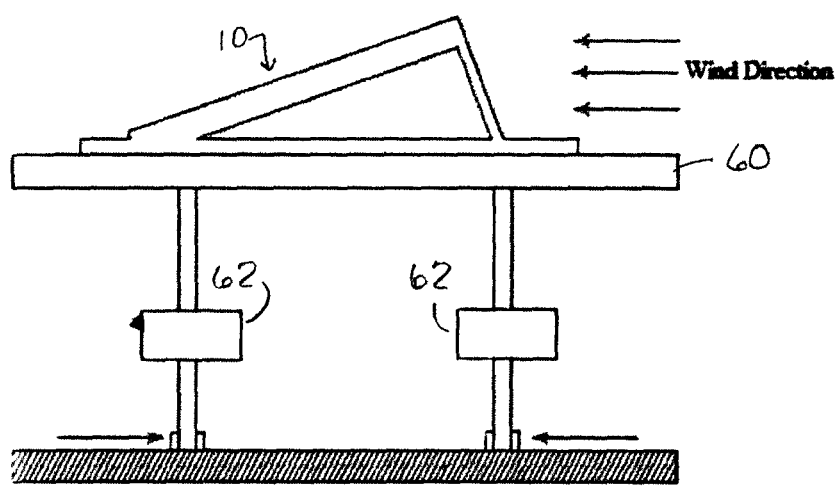
FIG. 6 provides a schematic diagram for a wind tunnel having load cells placed vertically in order to calculate the lift force in accord with an embodiment of the invention.

With reference to FIGS. 5 and 6, the panels 10 to be tested were mounted on a melamine board 60. Four load cells 62 (FUTEK's model LCF300-50 lb, ¼-28-thread) were used to record either lift (FIG. 6) or drag (FIG. 5) forces. The load cell support system was secured to the floor. Wind direction is indicated by the arrows in the upper right of each figure. The load cells operated on a full Wheatstone bridge 50 (NI 9237), shown in FIG. 3, providing the bridge circuitry. The wires for the load cells, the variable frequency drive (VFD, 58) for the fan, and the pressure sensors for the pitot-tubes interfaced with corresponding modules on the National Instruments cDAQ-9172 (FIG. 3, 54). The modules included: a NI 9219 (FIG. 3, 48) module configured to be a full bridge with an excitation voltage of 2.5 V, having leads from the pressure sensors inserted into and connected to terminals in the appropriate channels; a NI 9237 (FIG. 3, 50) module, also a full bridge as noted above used for the load cells, connected to proper channels via an RJ50 Cable (FIG. 3, 56)—10-pin modular plug, which served to set up the configuration for the module, to provide maximum voltage of 10 V excitation to the cells; and a NI 9264 (FIG. 3, 52) module, with a maximum voltage of +10 V, was used as the voltage input to the VFD to control the fan. The cDAQ-9172 was then connected to a PC. Through a calibration equation provided by FUTEK, the output dc voltage was converted to a force in lb. through LAB-VIEW program, known to those skilled in the art. In use, the wind tunnel program was opened and the load cells zeroed out, and the program started for 5000 or 1000 iterations.

Measurements were recorded at 4 different speeds: 15, 20, 25, and 27 mph. The wind tunnel test results are tabulated in Table 5, and are plotted in FIGS. 8 through 12.

Wind-Tunnel Testing Procedure

Figure 7:
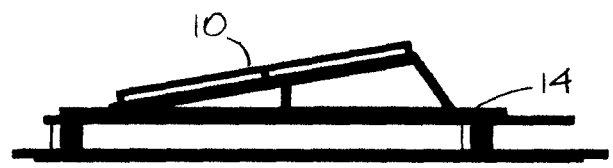
FIG. 7 is a schematic diagram of a single panel, without deflector, mounted for lift measurement in accord with an embodiment of the invention.
Figure 8:
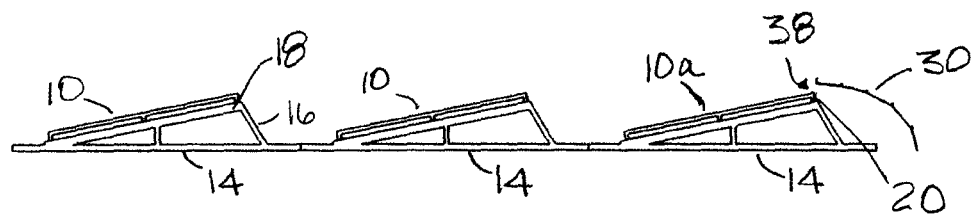
FIG. 8 is a schematic diagram of a three panel series, with deflector, mounted for lift measurement in accord with an embodiment of the invention.

Flow straightness and uniform speed along the test section, as well as flow steadiness, were studied both in the forced draft and then in the induced draft modes. All panels were tested in the induced draft mode as it was determined that the flow quality was better than in the forced draft mode. This necessitated the inclusion of a flow-alignment-neck-down-extension to the wind tunnel. The opening in the extension was 8 ft.×8 ft. and connected to the test section inlet of 4 ft.×4 ft. The flow speeds were measured at three random locations in the empty wind tunnel to determine the flow uniformity. Speeds varied below 4% for each motor rpm. The maximum air flow speed for testing was 27 mph. Next, the testing sequence of panels, their mountings in the tunnel, instrumentation and data acquisition protocol were determined. As noted, wind speeds of 15, 20, 25, and 27 mph were used, and tests were conducted on the following configurations: a single panel alone; a deflector alone; a single panel with deflector attached; a 3 panel array alone; and a 3-panel array with deflector attached. FIGS. 7 and 8 show a simple schematic of how i) a single panel-only 10 (no deflector) model and ii) a 3-panel array with deflector 30 were mounted, respectively.

Configurations were set up in the wind tunnel with DAQ and sensors, and the load cells were calibrated to record drag or lift force. The wind tunnel was set for 5000 sample force readings at each speed, except for a speed of 27 mph, for which 1000 sample readings were recorded. For each wind speed, a set of three 5000-sample readings were averaged and recorded by LABVIEW. Similarly, a set of three 1000-sample readings were averaged and recorded for 27 mph.

As shown in FIG. 8, the deflector is positioned at the front edge 20 of the front panel 10*a* panel such that the curve thereof is convex with respect to the panel position. FIG. 8 shows the deflector to be positioned such that a gap 38 exists between the panel front edge 20 and upper most edge 34 of the deflector 30. In addition, the deflector may be attached to the panel or surface by any suitable means, for example, by securing to the panel 10 or the support therefor 14/16/18 permanently, for example by bolting or welding, or may be secured such that it may be removed easily.

Wind-Tunnel Test Results

The load cells were first oriented to measure drag forces, then to measure lift forces for each test configuration and wind speed, and the results are provided in Table 5. Each load cell used in the wind-tunnel testing measured ±50 lbs (full-scale) with measurement uncertainty of 0.25% of full-scale reading. For all five test configurations of the scaled models, the lift and drag forces increased nonlinearly as the wind speed increased from 15 mph to 27 mph.

Figure 9:
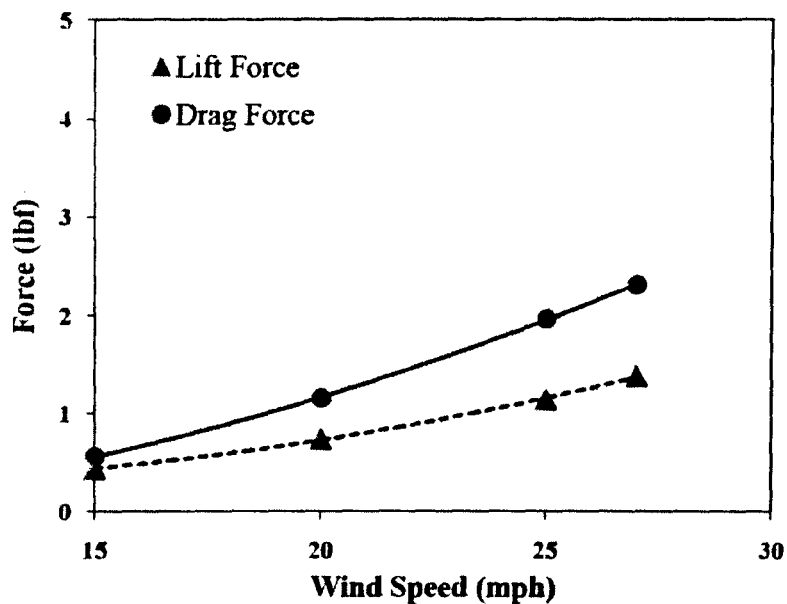
FIG. 9 is a graph of wind tunnel results for deflector in accord with an embodiment of the invention.

FIG. 9 provides a graph showing results for the deflector-only (no panel) configuration. The minimum and maximum drag forces were approximately 0.55 lbs. and 2.3 lbs., respectively, while the minimum and maximum lift forces were 0.48 lbs. and 1.4 lbs., respectively.

Figure 10:
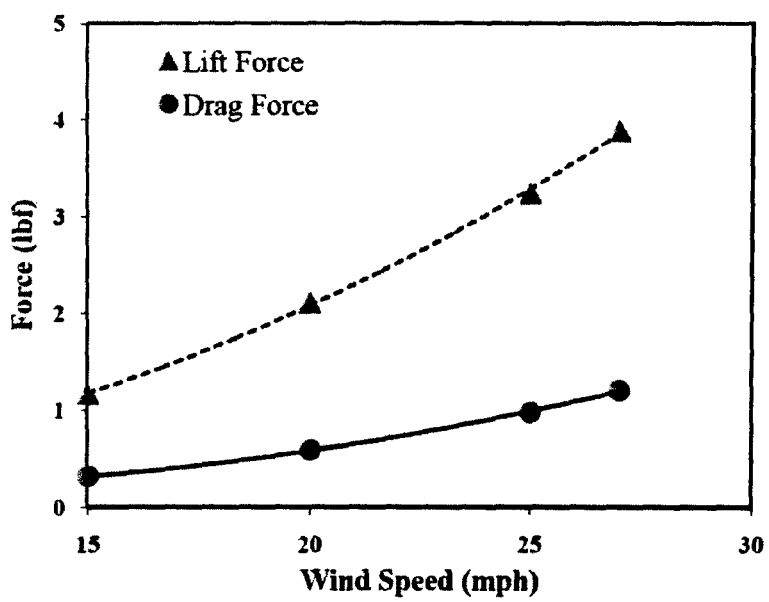
FIG. 10 is a graph of wind tunnel results for single panel only in accord with an embodiment of the invention.

FIG. 10 is a graph showing results for the panel-only (no deflector) arrangement. The minimum and maximum drag forces were approximately 0.3 lbs. and 1.2 lbs., respectively, while the minimum and maximum lift forces were 1.2 lbs. and 3.8 lbs., respectively.

Figure 11:
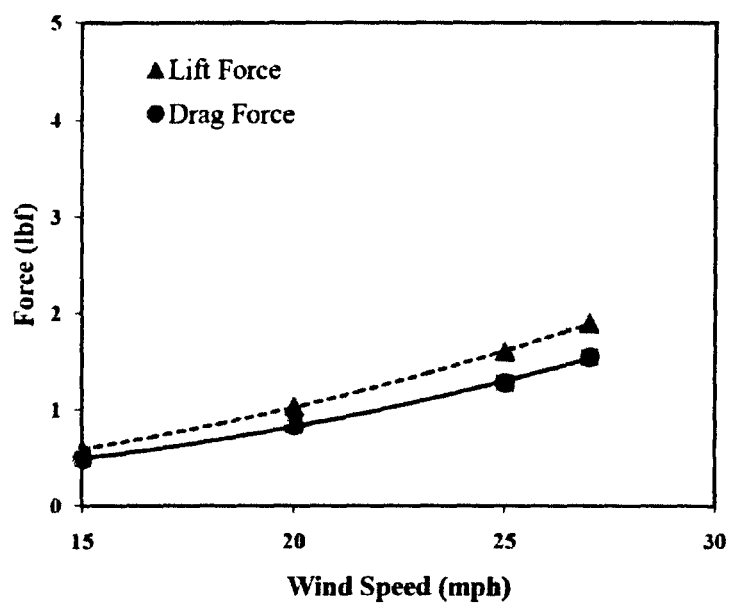
FIG. 11 is a graph of wind tunnel results for single panel and deflector in accord with an embodiment of the invention.

FIG. 11 is a graph showing results for the single panel plus deflector combination placed in the tunnel. Results indicate the minimum and maximum drag forces were approximately 0.5 lbs. and 1.5 lbs., respectively, while the minimum and maximum lift forces were 0.6 lbs. and 1.7 lbs., respectively. Therefore, the wind tunnel test data show that using the deflector reduced the lift forces for the panel-deflector arrangement, as compared to the panel-only arrangement, by more than 50% at the speeds tested, while the drag force was not significantly changed.

Figure 12:
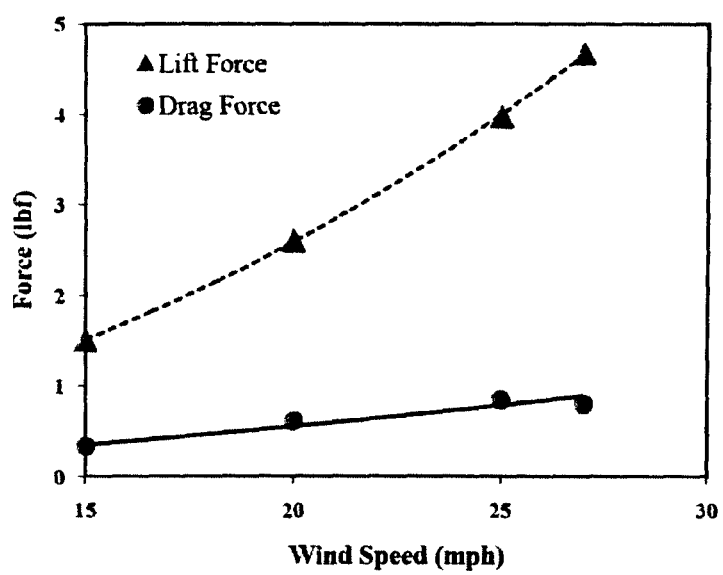
FIG. 12 is a graph of wind tunnel results for 3 panel series only in accord with an embodiment of the invention.

FIG. 12 is a graph showing results for the 3-panel-only arrangement. The minimum and maximum drag forces were approximately 0.45 lbs. and 0.85 lbs., respectively, while the minimum and maximum lift forces were 1.5 lbs. and 4.6 lbs., respectively.

FIG. 13 is a graph showing results for the 3-panel plus deflector combination. The minimum and maximum drag forces were approximately 0.45 lbs. and 1.00 lbs., respectively, while the minimum and maximum lift forces were 0.8 lbs. and 2.5 lbs., respectively. Therefore, the data demonstrates that one deflector placed in front of the 3-panel array reduced the lift forces by up to 50% with no significant change in drag force.

Computational Fluid Dynamics (CFD) Analysis and Results

Computational Fluid Dynamics (CFD) is extensively used by scientists and engineers to analyze virtually any type of fluid flow. CFD can provide a flexible and cost-effective tool to evaluate designs that can be subsequently tested in detail either by wind tunnel testing or in the field. A series of calculations was created based on CFD simulations of full scale and quarter scale solar panel(s) with and without the selected deflector. The CFD results compared favorably with those obtained through wind tunnel testing done for quarter-scale configurations.

Mathematical Modeling

ANSYS Fluent, a commercially available CFD program, was employed to simulate wind flow around the various panel-deflector arrangements as described above. Wind tunnel data from quarter scale models was used as a benchmarking tool to fully understand and realistically interpret the computational results obtained from full scale models generated using the program. Many physical and computational parameters were encountered and considered during the modeling procedure.

CFD flow simulation leads to the process of aerodynamic design by providing comprehensive information to designers about the entire flow field around the structure which is very complex. CFD, once calibrated to agree with wind tunnel testing within a reasonable limit of error, provides a more economical and less time intensive option than wind tunnel testing, and also enables engineers to design products where physical models or prototypes are not available for testing or where extensive testing would be cost-prohibitive. The efficiency of an aerodynamic CFD simulation depends on many factors. Some of these are: creation of the model geometry, discretization (grid generation) of the physical domain, the choice of the turbulence model, such as κ-ϵ as an example, the turbulence model constants, and the choice of a suitable numerical computing scheme. The turnaround time and confidence level in the predictions are two major criteria for success that compete with one another.

The standard $\Lambda$-$\epsilon$ model used herein was a semi-empirical model based on model transport equations for the turbulence kinetic energy ($\kappa$) and its dissipation rate ($\epsilon$).

FLUENT, state-of-the-art commercial computational fluid dynamics software for modeling fluid flow and heat transfer problems in complex geometries, along with ANSYS, was used to find the surface pressure distribution on both sides of the individual solar panel and a number of panels in-series with and without deflector. Surface pressure distributions on the top and bottom surfaces of the panel and deflector were calculated in order to determine a net force vector acting on the panel and deflector. The total drag is the summation of the vector components of downwind force ($F_x$) and the total uplift is the summation of the vector components of the vertical force ($F_y$). The overturning moment includes the vector summation of two moments produced by rotating around the ZZ axis assuming XX and YY axes as centers. Both two and three dimensional calculations were completed using the ANSYS Fluent with standard k-epsilon algorithms.

Numerical modeling and simulations were performed for single, and multiple panel arrangements at 10° angle/pitch, with and without deflector. For two-dimensional analysis, the computational domain was bounded on the inside by the panel closed path, and by a rectangular box on the outside. The rectangular domain was constructed with 3~5 times the panel length for the leading (front) edge and 10~15 times the panel length for the trailing (back) edge. The flow field was discretized with over 50,000 cells of rectangular and triangular elements distributed to produce maximum resolution along the panel and deflector surfaces. The quarter scaled models were subjected to a 27 mph uniform inlet velocity whereas the full scale models were subjected to a 110 mph uniform inlet velocity. The outlet boundary condition was constrained to be atmospheric pressure. The top and bottom walls of the computational domain were wall boundary conditions and similarly the panel and deflector surfaces were setup as wall boundaries with no-slip conditions. In order to adequately resolve the boundary layer along the panel and deflector walls, grid points were clustered near the wall with smaller growth rate for better refinement and lower skewedness of the mesh elements. Further away from these walls, where the flow does not have large velocity gradients, the grid points were less clustered.

Three dimensional computations were performed for single, and multiple panel arrangements at 10° angle with and without deflector. An appropriate three dimensional fluid domain enclosing the model was constructed. The flow field was discretized with over 500,000 cells of rectangular and triangular elements distributed to produce maximum resolution along the panel and the deflector surfaces. The full scale models were subjected to a 110 mph inlet velocity and outlet boundary condition was constrained to be atmospheric pressure. The top, bottom and side walls of the computational domain were wall boundary conditions and similarly the panel and deflector surfaces were setup as wall boundaries with no slip conditions. In order to adequately resolve the boundary layer along the rack and deflector walls, grid points were clustered near the wall with smaller growth rate for better refinement and lower skewed ness of the mesh elements. Further away from these walls, where the flow does not have large velocity gradients, the grid points were less clustered.

CFD Results

The κ-ε approach had a reasonable agreement of trends with the measured lift and drag loads for quarter scaled models; however the κ-ω and RNG turbulence models may also be used. The κ-ε approach also had abnormal deviations from the measured data for some loads (drag, lift) in the wind tunnel testing. Static pressure contours, velocity magnitude contours, velocity vector profiles near the front of the array, velocity vectors near the back of the array, and particle path lines were also considered for different arrangements of panel/arrays with and without the deflector.

The results generated by the two- and three-dimensional CFD models provided initial insight into the dynamics of flow above and around the conceptual solar panel arrangements with and without deflector. The parabolic deflector with finned profile identified the effects of a curved shaped deflector before the panels, the relative influence of winds blowing, and the value of the finned additions on the parabolic shape of the deflector. From such distributions lift and drag coefficients were calculated. The CFD calculations of overall loads (both drag and lift) for each of the quarter scale models were compared with the wind-tunnel test results.

It was determined that the wind penetrated throughout the gaps between the mounting surface and the bottom surface of the and the interior panel supports preventing uniform distribution of air flow and causing strong three dimensional flow patterns. The comparisons between the measured data and the CFD data were good enough to validate the use of CFD calculations for comparative solar panel/array system performance on the aerodynamic stability. All computations were repeated 3 to 5 times to ensure the simulation results. Tests were conducted on deflector profiles as follows: cylinder, vertical flat plate, inclined plate, horizontal flat plate, and sphere. Compared to the theoretical coefficients of wind loads such as coefficients of lift and drag, the computational results had shown very close approximations in all of the models mentioned. Those models were simulated with various wind speeds and with various geometries in order to check parametric cross-dependencies between the computational results of wind loads for each model.

In conclusion, CFD/FLUENT demonstrated reasonably close approximations of wind loads, within 15% error, compared to those from published data for a specific choice of refined grid structure, error tolerance, and turbulence model. Therefore, these studies confirmed the validity and capability of the FLUENT codes in order to simulate wind loads for solar panel rack systems. Table 1 shows a comparison between wind tunnel test data and CFD simulation for 27 mph wind speed, and Table 2 presents the percentage difference noted between the wind tunnel test data and the CFD results shown in Table 1.

TABLE 1

Wind Tunnel Test Data and CFD Results for Quarter-Scale models with Input Wind Velocity = 27 mph.

| | Wind Loads (lbf) Obtained From | | | |
|---|---|---|---|---|
| | Wind Tunnel Data | | CFD Results | |
| Quarter-Scale Models For Vinlet = 27 mph | Lift., FL | Drag, FD | Lift., FL | Drag, FD |
| Single Rack Only | 3.88 | 1.2 | 2.8 | 2.73 |
| Deflector Only | 1.38 | 2.3 | 2.08 | 4.08 |
| Single Rack and Deflector | 1.89 | 1.54 | 1.76 | 2.48 |
| 3 Racks Array | 4.67 | 0.8 | 5.99 | 4.09 |
| 3 Racks Array and Deflector | 2.54 | 1.01 | 2.75 | 3.25 |

TABLE 2

Wind Tunnel Data vs. CFD Results for Quarter-Scale models with Input Wind Velocity = 227 mph.

| | Wind Tunnel Vs CFD Percent Difference for | | Experimental Reduction (%) by using deflector for | | Computational Reduction (%) by using deflector for | |
|---|---|---|---|---|---|---|
| Quarter-Scale Models For Vinlet = 27 mph | Lift., FL | Drag, FD | Lift., FL | Drag, FD | Lift., FL | Drag, FD |
| Single Rack Only | 27.84 | 127.50 | 51.29 | −28.33 | 37.14 | 9.16 |
| Deflector Only | −50.72 | 77.39 | | | | |
| Single Rack and Deflector | 6.88 | 61.04 | | | | |
| 3 Racks Array | −28.27 | 411.25 | 45.61 | −26.25 | 54.09 | 20.54 |
| 3 Racks Array and Deflector | −8.27 | 221.78 | | | | |

As shown, the use of the proposed deflector depicted experimentally reduced wind uplifts by 51.29% and 45.61%, respectively, in quarter-scale single panel only and 3 panel only arrangement. The computational study agrees with a very close prediction of 37.14% and 54.09% reductions of wind uplifts for the respective single panel only and 3 panels only arrangement. The differences between the wind tunnel test data and the CFD results were found to be within ±10% for wind uplift predictions. In terms of drag results, experimental results showed slight additions in wind drag for both single panel only and 3 panel only arrangements, around 25%. This addition in wind drag is expected as the addition of a deflector with the panel arrays will somewhat increase the drag force. Comparing the respective drag and uplift forces for both the scenarios of single panel only and 3 panel array arrangement, drag forces were ~70% smaller than the wind uplift. This comparison explains that the reduction in wind uplift is crucial for design and installation purposes, while that for the wind drag forces is less crucial. Similarly, wind drag forces were computed to be reduced by 9.16% and 20.54%, respectively, by the application of the proposed deflector with the single panel only and 3 panel array arrangements. The relative differences between the drag test data and drag results by computer simulations are within 50% for both a single panel-only and a 3 panel-only arrangements.

Table 3 below shows CFD results for a set of full scale models with an input wind speed of 110 mph. Using the proposed deflector for both arrangements of the single panel and 5-panel array, wind uplift forces were computed to be reduced by at least 50% while the drag forces were reduced by 33% (Table 4).

TABLE 3

CFD Results for Full Scale Models with Input Wind Velocity = 110 mph.

| Full-Scale Models | 2-Dimensional CFD Results (lbf) | |
|---|---|---|
| | Lift., FL | Drag, FD |
| Single Panel Only | 539 | 850 |
| Single Panel and Deflector | −69 | 565 |
| 5 Panels Array | 1662 | 1000 |
| 5 Panels Array and Deflector | 764 | 670 |

TABLE 4

Reduction in wind loads predicted by CFD Results for Full Scale Models with Input Wind Velocity = 110 mph.

| Full-Scale Models | Percentage Reduction by using deflector for | |
|---|---|---|
| | Lift., FL | Drag, FD |
| Single Panel Only Single Panel and Deflector | −112.80 | −33.53 |
| 5 Panels Array 5 Panels Array and Deflector | −54.03 | −32.99 |

The static pressure contours displayed by 3D simulations were modified from their 2D counterparts by the presence of cross-flow circulations and the blocking effects of the internal solar panel support rails. Inclusion of these differences of the flow field in the calculations may lead to significant improvement in the computational predictions of load. Again, there is reasonable agreement for both lift and drag compared to the results obtained from the quarter scaled 2D simulations and the wind tunnel data. The comparisons between measured data and the CFD data were good enough to validate the use of CFD calculations for comparative solar panel system performance on the aerodynamic stability. Two specific scenarios of a single panel with the deflector and 5-panels with deflector were simulated in 3D and compared with 2D simulations which were observed to be in a reasonable range of agreement.

With reference to FIGS. 14A-14C, and further reference to FIG. 8, there are provided various perspective schematic diagrams showing the gap 38 between the deflector 30 and the panel 10 in at least one embodiment of the invention. This distance of gap 38 may be 0, i.e. the deflector may be attached directly to the panel, or it may be inches, i.e. greater than 0, for example greater than 1 inch, for example greater than 4 inches. While not intending to be bound by any particular theory, it is believed that though attaching the deflector directly to the panel will be beneficial, a greater benefit may be achieved by providing a gap between the deflector and the panel, as shown for example in FIG. 14, as long as the deflector is not spaced so far away from the panel as to allow aerodynamic forces to flow over the deflector and under or around the panel.

In FIGS. 15A-15B are schematic diagrams of a solar array in accord with another embodiment of the invention wherein the panels 10 are configured in a single row, and deflector 30 is placed before the front-most panel 10a. The remaining panels are each shown to have a shield 22 that is positioned to block wind or aerodynamic force. While this embodiment is as shown, in an alternative embodiment not all panels have a shield. In another alternative embodiment, shields may be placed either as shown or on one or the other side of the panel. In yet another embodiment, not all panels have a shield in the same position.

FIGS. 16A-16B provide schematic diagrams of a series of solar panels, from the top, FIG. 16A, and from the side, FIG. 16B, configured in a solar array 68 having multiple rows of panels 10. In this Fig., panels 10 are shielded on three sides by deflectors 30 as in accord with at least one embodiment of the invention. For example, in one embodiment, the deflectors essentially form a wall of deflectors on three sides of the array 68. The deflectors may be installed such that there is no gap between the underside of deflectors and the roof surface. The side walls are intended to manage winds from east to west, west to east, north easterly, and north westerly directions so that the panels 10 in the array 68 are protected. The deflector walls and the panel array may be interconnected to form one integral unit so that the lift and drag forces are counteracted by the total weight of the array plus deflector walls in addition to the effect of wind management by the deflectors to reduce these forces. In one embodiment, tray connectors as known in the art of solar panel arrays may be used. As shown in FIGS. 15A-15B, the front row of panels may be spaced from the deflector without a shield, and one or more of the remaining panels, or all of the remaining panels, in each row of the array may include a shield. In another embodiment, the deflector walls may be assembled in straight sections to achieve the overall elliptic profile. The parabolic profile may be truncated with or without an attachment of a straight panel. The fins shown in several embodiments herein along the width are proven for reducing the wind uplift and may also be included. These geometrical modifications in the deflector profile may result in space savings for the end users.

The wind deflector described herein may be constructed of any material suitable for use within the parameters provided. For example, the deflector may be constructed from aluminum, plastic, metal, alloy, fiberglass, or any such material that is at least semi-rigid and capable of retaining its shape under the aerodynamic forces referred to throughout the disclosure, or any combination of the foregoing.

TABLE 5

Wind Tunnel Test Data of Quarter-Scale Models For Different Wind Speeds

Model
Rack only inside wind tunnel

Lift Force (lbs)

| Trial | mph | Load Cell 1 | Load Cell 2 | Load Cell 3 | Load Cell 4 | Total Lift (lbs) | Avg. (lbs) |
|---|---|---|---|---|---|---|---|
| 5000 samples | | | | | | | |
| 1 | 15 | 0.1928 | 0.3966 | 0.1796 | 0.3825 | 1.1516 | 1.1666 |
| 2 | 15 | 0.1917 | 0.4030 | 0.1804 | 0.3994 | 1.1745 | |
| 3 | 15 | 0.1878 | 0.3979 | 0.1898 | 0.3984 | 1.1739 | |
| 1 | 20 | 0.3502 | 0.7222 | 0.3407 | 0.7134 | 2.1268 | 2.1095 |
| 2 | 20 | 0.3566 | 0.7250 | 0.3088 | 0.7026 | 2.0929 | |
| 3 | 20 | 0.3577 | 0.7289 | 0.3186 | 0.7038 | 2.1090 | |
| 1 | 25 | 0.5616 | 1.0960 | 0.4928 | 1.0551 | 3.2054 | 3.2420 |
| 2 | 25 | 0.5817 | 1.1165 | 0.5056 | 1.0806 | 3.2845 | |
| 3 | 25 | 0.5606 | 1.0957 | 0.5006 | 1.0794 | 3.2362 | |
| 1000 samples | | | | | | | |
| 1 | 27 | 0.6847 | 1.2725 | 0.6643 | 1.2822 | 3.9037 | 3.8885 |
| 2 | 27 | 0.6852 | 1.2800 | 0.6220 | 1.2662 | 3.8534 | |
| 3 | 27 | 0.6855 | 1.2760 | 0.6484 | 1.2986 | 3.9084 | |

Drag Force (lbs)

| Trial | mph | Load Cell 1 | Load Cell 2 | Load Cell 3 | Load Cell 4 | Total Drag (lbs) | Avg. (lbs) |
|---|---|---|---|---|---|---|---|
| 5000 samples | | | | | | | |
| 1 | 15 | 0.3805 | 0.1867 | −0.1943 | −0.0548 | 0.3181 | 0.3164 |
| 2 | 15 | 0.3954 | 0.1935 | −0.2141 | −0.0637 | 0.3111 | |
| 3 | 15 | 0.3893 | 0.1893 | −0.2055 | −0.0532 | 0.3200 | |
| 1 | 20 | 0.6775 | 0.3329 | −0.3365 | −0.0901 | 0.5839 | 0.5903 |
| 2 | 20 | 0.6840 | 0.3330 | −0.3401 | −0.0813 | 0.5956 | |
| 3 | 20 | 0.6742 | 0.3286 | −0.3281 | −0.0831 | 0.5915 | |
| 1 | 25 | 1.0133 | 0.4845 | −0.4309 | −0.0959 | 0.9711 | 0.980 |
| 2 | 25 | 0.9939 | 0.4716 | −0.4071 | −0.0753 | 0.9830 | |
| 3 | 25 | 1.0005 | 0.4746 | −0.4106 | −0.0771 | 0.9878 | |
| 1000 samples | | | | | | | |
| 1 | 27 | 1.2137 | 0.5714 | −0.4835 | −0.1032 | 1.1984 | 1.2060 |
| 2 | 27 | 1.1999 | 0.5723 | −0.4665 | −0.0943 | 1.2114 | |
| 3 | 27 | 1.2237 | 0.5786 | −0.4858 | −0.1084 | 1.2082 | |

Model
Deflector only inside wind tunnel

Lift Force (lbs)

| Trial | mph | Load Cell 1 | Load Cell 2 | Load Cell 3 | Load Cell 4 | Total Lift (lbs) | Average (lbs) |
|---|---|---|---|---|---|---|---|
| 5000 samples | | | | | | | |
| 1 | 15 | 0.2156 | 0.2464 | −0.0165 | 0.0032 | 0.4488 | 0.4402 |
| 2 | 15 | 0.2047 | 0.2371 | −0.0143 | 0.0057 | 0.4331 | |
| 3 | 15 | 0.2008 | 0.2436 | −0.0065 | 0.0008 | 0.4388 | |
| 1 | 20 | 0.3766 | 0.3922 | −0.0308 | −0.0146 | 0.7233 | 0.7386 |
| 2 | 20 | 0.3805 | 0.3928 | −0.0116 | −0.0039 | 0.7578 | |
| 3 | 20 | 0.3782 | 0.3889 | −0.0210 | −0.0113 | 0.7348 | |
| 1 | 25 | 0.5910 | 0.6061 | 0.0045 | 0.0023 | 1.2039 | 1.1432 |
| 2 | 25 | 0.5888 | 0.5936 | −0.0239 | −0.0392 | 1.1192 | |
| 3 | 25 | 0.6041 | 0.6031 | −0.0437 | −0.0570 | 1.1065 | |

TABLE 5-continued

Wind Tunnel Test Data of Quarter-Scale Models For Different Wind Speeds 1000 samples

| Trial | mph | | | | | | |
|---|---|---|---|---|---|---|---|
| 1 | 27 | 0.7135 | 0.7351 | −0.0357 | −0.0158 | 1.3971 | 1.3816 |
| 2 | 27 | 0.6991 | 0.7004 | −0.0493 | 0.0164 | 1.3667 | |
| 3 | 27 | 0.7224 | 0.7186 | −0.0343 | −0.0258 | 1.3809 | |

Drag Force (lbs)

| Trial | mph | Load Cell 1 | Load Cell 2 | Load Cell 3 | Load Cell 4 | Total Drag (lbs) | Average (lbs) |
|---|---|---|---|---|---|---|---|

5000 samples

| Trial | mph | Load Cell 1 | Load Cell 2 | Load Cell 3 | Load Cell 4 | Total Drag (lbs) | Average (lbs) |
|---|---|---|---|---|---|---|---|
| 1 | 15 | 0.3290 | 0.0834 | 0.0866 | 0.0620 | 0.5609 | 0.5611 |
| 2 | 15 | 0.3636 | 0.0890 | 0.0780 | 0.0388 | 0.5694 | |
| 3 | 15 | 0.3583 | 0.0902 | 0.0652 | 0.0392 | 0.5530 | |
| 1 | 20 | 0.6261 | 0.2712 | 0.1803 | 0.0776 | 1.1553 | 1.1583 |
| 2 | 20 | 0.6351 | 0.2741 | 0.1820 | 0.0701 | 1.1614 | |
| 3 | 20 | 0.6332 | 0.2727 | 0.1789 | 0.0734 | 1.1582 | |
| 1 | 25 | 0.9144 | 0.5568 | 0.3792 | 0.1199 | 1.9703 | 1.9664 |
| 2 | 25 | 0.9077 | 0.5556 | 0.3809 | 0.1222 | 1.9664 | |
| 3 | 25 | 0.9080 | 0.5540 | 0.3798 | 0.1206 | 1.9625 | |

1000 samples

| Trial | mph | Load Cell 1 | Load Cell 2 | Load Cell 3 | Load Cell 4 | Total Drag (lbs) | Average (lbs) |
|---|---|---|---|---|---|---|---|
| 1 | 27 | 1.0863 | 0.6384 | 0.4667 | 0.1345 | 2.3260 | 2.3099 |
| 2 | 27 | 1.0654 | 0.6227 | 0.4503 | 0.1453 | 2.2837 | |
| 3 | 27 | 1.0705 | 0.6252 | 0.4864 | 0.1378 | 2.3199 | |

Model
Rack and deflector inside wind tunnel
Lift Force (lbs)

| Trial | mph | Load Cell 1 | Load Cell 2 | Load Cell 3 | Load Cell 4 | Total Lift (lbs) | Avg. (lbs) |
|---|---|---|---|---|---|---|---|

5000 samples

| Trial | mph | Load Cell 1 | Load Cell 2 | Load Cell 3 | Load Cell 4 | Total Lift (lbs) | Avg. (lbs) |
|---|---|---|---|---|---|---|---|
| 1 | 15 | 0.2726 | 0.2525 | 0.0327 | 0.0145 | 0.5722 | 0.5876 |
| 2 | 15 | 0.2764 | 0.2468 | 0.0485 | 0.0356 | 0.6073 | |
| 3 | 15 | 0.2768 | 0.2496 | 0.0436 | 0.0132 | 0.5831 | |
| 1 | 20 | 0.4644 | 0.4561 | 0.0743 | 0.0593 | 1.0541 | 1.0165 |
| 2 | 20 | 0.4747 | 0.4438 | 0.0418 | 0.0366 | 0.9969 | |
| 3 | 20 | 0.4646 | 0.4454 | 0.0631 | 0.0629 | 1.0360 | |
| 1 | 25 | 0.7142 | 0.6855 | 0.1027 | 0.1092 | 1.6116 | 1.5966 |
| 2 | 25 | 0.7166 | 0.6910 | 0.1219 | 0.0734 | 1.6029 | |
| 3 | 25 | 0.7088 | 0.6821 | 0.0978 | 0.0866 | 1.5754 | |

1000 samples

| Trial | mph | Load Cell 1 | Load Cell 2 | Load Cell 3 | Load Cell 4 | Total Lift (lbs) | Avg. (lbs) |
|---|---|---|---|---|---|---|---|
| 1 | 27 | 0.8602 | 0.7970 | 0.1603 | 0.0743 | 1.8919 | 1.8968 |
| 2 | 27 | 0.8513 | 0.7893 | 0.1291 | 0.0797 | 1.8494 | |
| 3 | 27 | 0.8617 | 0.8109 | 0.1666 | 0.1098 | 1.9491 | |

Drag Force (lbs)

| Trial | mph | Load Cell 1 | Load Cell 2 | Load Cell 3 | Load Cell 4 | Total Drag (lbs) | Avg. (lbs) |
|---|---|---|---|---|---|---|---|

5000 samples

| Trial | mph | Load Cell 1 | Load Cell 2 | Load Cell 3 | Load Cell 4 | Total Drag (lbs) | Avg. (lbs) |
|---|---|---|---|---|---|---|---|
| 1 | 15 | 0.3954 | 0.0898 | 0.0126 | −0.0055 | 0.4923 | 0.4890 |
| 2 | 15 | 0.3840 | 0.0990 | 0.0378 | −0.0359 | 0.4849 | |
| 3 | 15 | 0.3964 | 0.1002 | 0.0313 | −0.0383 | 0.4897 | |
| 1 | 20 | 0.7040 | 0.1704 | 0.0282 | −0.0660 | 0.8366 | 0.8334 |
| 2 | 20 | 0.7004 | 0.1750 | 0.0373 | −0.0781 | 0.8345 | |
| 3 | 20 | 0.7002 | 0.1748 | 0.0227 | −0.0687 | 0.8289 | |
| 1 | 25 | 1.0486 | 0.2681 | 0.0673 | −0.1010 | 1.2830 | 1.2746 |
| 2 | 25 | 1.0393 | 0.2753 | 0.0588 | −0.1042 | 1.2692 | |
| 3 | 25 | 1.0378 | 0.2785 | 0.0630 | −0.1077 | 1.2716 | |

TABLE 5-continued

Wind Tunnel Test Data of Quarter-Scale Models For Different Wind Speeds 1000 samples

| Trial | mph | Load Cell 1 | Load Cell 2 | Load Cell 3 | Load Cell 4 | Total Lift (lbs) | Average (lbs) |
|---|---|---|---|---|---|---|---|
| 1 | 27 | 1.2343 | 0.3446 | 0.1075 | −0.1384 | 1.5481 | 1.5428 |
| 2 | 27 | 1.2208 | 0.3478 | 0.0733 | −0.1148 | 1.5270 | |
| 3 | 27 | 1.2206 | 0.3526 | 0.0966 | −0.1166 | 1.5533 | |

Model
3 racks only inside wind tunnel

Lift Force (lbs)

| Trial | mph | Load Cell 1 | Load Cell 2 | Load Cell 3 | Load Cell 4 | Total Lift (lbs) | Average (lbs) |
|---|---|---|---|---|---|---|---|
| 5000 samples | | | | | | | |
| 1 | 15 | 0.2938 | 0.3077 | 0.4712 | 0.4784 | 1.5510 | 1.5097 |
| 2 | 15 | 0.3006 | 0.3141 | 0.4405 | 0.4101 | 1.4654 | |
| 3 | 15 | 0.2909 | 0.3230 | 0.4559 | 0.4430 | 1.5126 | |
| 1 | 20 | 0.5251 | 0.5608 | 0.8065 | 0.7658 | 2.6582 | 2.6080 |
| 2 | 20 | 0.5151 | 0.5085 | 0.7732 | 0.7570 | 2.5537 | |
| 3 | 20 | 0.5070 | 0.5153 | 0.7982 | 0.7915 | 2.6122 | |
| 1 | 25 | 0.8179 | 0.7958 | 1.2258 | 1.1875 | 4.0270 | 3.9796 |
| 2 | 25 | 0.8215 | 0.7862 | 1.2006 | 1.1772 | 3.9855 | |
| 3 | 25 | 0.8107 | 0.7441 | 1.1933 | 1.1783 | 3.9264 | |
| 1000 samples | | | | | | | |
| 1 | 27 | 0.9319 | 0.8531 | 1.4203 | 1.3250 | 4.5303 | 4.6710 |
| 2 | 27 | 0.9998 | 0.9574 | 1.5402 | 1.4243 | 4.9217 | |
| 3 | 27 | 0.8804 | 0.8186 | 1.4321 | 1.4300 | 4.5610 | |

Drag Force (lbs)

| Trial | mph | Load Cell 1 | Load Cell 2 | Load Cell 3 | Load Cell 4 | Total Drag (lbs) | Average (lbs) |
|---|---|---|---|---|---|---|---|
| 5000 samples | | | | | | | |
| 1 | 15 | 0.0827 | 0.0988 | 0.1134 | −0.0228 | 0.2721 | 0.3330 |
| 2 | 15 | 0.1381 | 0.1433 | 0.1143 | −0.0377 | 0.3579 | |
| 3 | 15 | 0.1505 | 0.1586 | 0.1155 | −0.0557 | 0.3688 | |
| 1 | 20 | 0.2597 | 0.2474 | 0.1919 | −0.0942 | 0.6049 | 0.6142 |
| 2 | 20 | 0.2380 | 0.2278 | 0.2057 | −0.0442 | 0.6273 | |
| 3 | 20 | 0.2202 | 0.2146 | 0.2101 | −0.0345 | 0.6104 | |
| 1 | 25 | 0.3161 | 0.2543 | 0.2877 | 0.0051 | 0.8632 | 0.8479 |
| 2 | 25 | 0.2996 | 0.2342 | 0.2738 | 0.0302 | 0.8378 | |
| 3 | 25 | 0.2894 | 0.2166 | 0.2837 | 0.0532 | 0.8428 | |
| 1000 samples | | | | | | | |
| 1 | 27 | 0.3177 | 0.1152 | 0.2274 | 0.1655 | 0.8258 | 0.8001 |
| 2 | 27 | 0.2941 | 0.0518 | 0.2494 | 0.2133 | 0.8086 | |
| 3 | 27 | 0.2414 | 0.0011 | 0.2594 | 0.2639 | 0.7658 | |

Model
3 racks and deflector inside wind tunnel

Lift Force (lbs)

| Trial | mph | Load Cell 1 | Load Cell 2 | Load Cell 3 | Load Cell 4 | Total Lift (lbs) | Average (lbs) |
|---|---|---|---|---|---|---|---|
| 5000 samples | | | | | | | |
| 1 | 15 | 0.2753 | 0.2594 | 0.1814 | 0.2082 | 0.9244 | 0.8494 |
| 2 | 15 | 0.2552 | 0.2427 | 0.1726 | 0.1653 | 0.8359 | |
| 3 | 15 | 0.2368 | 0.2371 | 0.1614 | 0.1527 | 0.7880 | |
| 1 | 20 | 0.4111 | 0.4323 | 0.2551 | 0.2626 | 1.3612 | 1.3998 |
| 2 | 20 | 0.4176 | 0.4432 | 0.2817 | 0.2691 | 1.4116 | |
| 3 | 20 | 0.4160 | 0.4443 | 0.2923 | 0.2740 | 1.4266 | |
| 1 | 25 | 0.6565 | 0.6926 | 0.4240 | 0.4094 | 2.1824 | 2.1434 |
| 2 | 25 | 0.6336 | 0.6842 | 0.3899 | 0.3860 | 2.0937 | |
| 3 | 25 | 0.6372 | 0.6936 | 0.4126 | 0.4105 | 2.1539 | |

TABLE 5-continued

Wind Tunnel Test Data of Quarter-Scale Models For Different Wind Speeds

| 1000 samples | | | | | | | |
|---|---|---|---|---|---|---|---|
| 1 | 27 | 0.7697 | 0.8084 | 0.5054 | 0.4776 | 2.5619 | 2.5483 |
| 2 | 27 | 0.7576 | 0.8333 | 0.4814 | 0.4513 | 2.5236 | |
| 3 | 27 | 0.7367 | 0.7999 | 0.5509 | 0.4727 | 2.5602 | |

| | | Drag Force (lbs) | | | | | |
|---|---|---|---|---|---|---|---|
| Trial | mph | Load Cell 1 | Load Cell 2 | Load Cell 3 | Load Cell 4 | Total Drag (lbs) | |
| 5000 samples | | | | | | | |
| 1 | 15 | 0.0374 | −0.0864 | 0.1876 | 0.2570 | 0.3946 | 0.4089 |
| 2 | 15 | 0.0376 | −0.0954 | 0.2068 | 0.2774 | 0.4264 | |
| 3 | 15 | 0.0382 | −0.0918 | 0.1928 | 0.2664 | 0.4057 | |
| 1 | 20 | 0.0758 | −0.1511 | 0.3531 | 0.4461 | 0.7239 | 0.7119 |
| 2 | 20 | 0.0739 | −0.1609 | 0.3508 | 0.4555 | 0.7193 | |
| 3 | 20 | 0.0761 | −0.1443 | 0.3346 | 0.4260 | 0.6924 | |
| 1 | 25 | 0.1191 | −0.2465 | 0.4853 | 0.6915 | 1.0494 | 1.0324 |
| 2 | 25 | 0.1137 | −0.2421 | 0.4784 | 0.6838 | 1.0338 | |
| 3 | 25 | 0.0986 | −0.2603 | 0.4875 | 0.6880 | 1.0139 | |
| 1000 samples | | | | | | | |
| 1 | 27 | 0.0974 | −0.3605 | 0.3421 | 0.9666 | 1.0456 | 1.0063 |
| 2 | 27 | 0.0913 | −0.3669 | 0.3276 | 0.9611 | 1.0131 | |
| 3 | 27 | 0.0850 | −0.3659 | 0.2995 | 0.9417 | 0.9603 | |

While the invention has been described in detail in connection with a number of embodiments, the invention is not limited to such disclosed embodiments. Rather, the invention can be modified to incorporate any number of variations, alterations, substitutions, or equivalent arrangements not heretofore described, but which are commensurate with the scope of the invention. Additionally, while various embodiments of the invention have been described, it is to be understood that aspects of the invention may include only some of the described embodiments. Accordingly, the invention should not be limited by the foregoing description, but is only limited by the scope of the appended claims.

What we claim is:

1. A method for reducing aerodynamic force impinging a roof-top solar panel, comprising:
   a) providing a solar panel;
   b) mounting the solar panel to a horizontal roof-top surface affected by aerodynamic forces;
   c) positioning the solar panel at an angle to the surface of up to about 30°;
   d) securing to one or both of the solar panel and the surface a wind deflector having a parabolic or elliptical curved profile, wherein the wind deflector has a width, w, that is at least equal to the width of the solar panel and a height, h, that is at least equal to the distance between the horizontal roof-top surface and a highest portion of the solar panel, and wherein the wind deflector further includes at least one fin; and
   e) allowing the aerodynamic forces to encounter the wind deflector before encountering the solar panel.

2. The method according to claim 1, wherein the aerodynamic forces result in the solar panel experiencing at least one of uplift and drag.

3. The method according to claim 1, wherein the wind deflector deflects enough aerodynamic force to reduce uplift by at least about 50%.

4. The method according to claim 1, wherein the deflector has a width and a height, and the width is longer than the height.

5. The method according to claim 1, wherein the at least one fin of the wind deflector extends outwardly from a convex surface thereof.

6. The method according to claim 1, wherein the fin is configured to extend from the aerodynamic force-facing surface of the wind deflector parallel to the horizontal surface for at least the full width, w, of the wind deflector.

7. The method according to claim 1, wherein the wind deflector has a parabolic profile and the curvature thereof satisfies the expression:

$$y = A\sqrt{\left(1 - \frac{x}{B}\right)}$$

wherein
A and B are linear measurements and A<B:
A=the vertical height of the solar panel, and
B=the horizontal length of the wind deflector.

8. The method according to claim 1, wherein the wind deflector has an elliptical profile and the curvature thereof satisfies the expression:

$$y = A\sqrt{1 - \left(\frac{x}{B}\right)^2}$$

wherein
A and B are linear measurements and A<B:
A=the vertical height of the solar panel, and
B=the horizontal length of the wind deflector.

9. A wind deflector system, comprising:

a pitched structure secured to a horizontal surface, the pitched structure having a vertical height and a width; and a wind deflector configured for mounting with the pitched structure, the wind deflector including at least one curved surface having a curve with either a parabolic or elliptical profile, wherein the at least one curved surface is configured to be positioned such that the curve is convex to the pitched structure and the at least one curved surface is configured to receive one or more aerodynamic forces before such aerodynamic forces encounter the pitched structure;

wherein the wind deflector has a width, w, that is at least equal to the width of the pitched structure and a height, h, that is at least equal to a distance between the horizontal surface and a highest portion of the pitched structure, and wherein at least one fin is configured to run parallel to the horizontal surface and the full width, w, of the wind deflector.

* * * * *